United States Patent [19]
Richter, Jr.

[11] 3,834,125
[45] Sept. 10, 1974

[54] HIGHLY EFFICIENT LONG LIFE GAS TRAP
[75] Inventor: Albert P. Richter, Jr., Houston, Tex.
[73] Assignee: Texaco Inc., New York, N.Y.
[22] Filed: Dec. 18, 1972
[21] Appl. No.: 315,949

[52] U.S. Cl.................. 55/208, 55/316, 55/389, 165/61
[51] Int. Cl................ B01d 53/04, F25b 29/00
[58] Field of Search............ 55/33, 62, 74, 75, 179, 55/208, 386, 389, 316; 165/61

[56] References Cited
UNITED STATES PATENTS
| | | | |
|---|---|---|---|
| 2,755,506 | 7/1956 | Weber | 165/61 |
| 3,264,803 | 8/1966 | Read | 55/208 |
| 3,626,671 | 12/1971 | Ebeling | 55/179 |
| 3,734,293 | 5/1973 | Biskis | 55/208 |

*Primary Examiner*—Charles N. Hart
*Attorney, Agent, or Firm*—T. H. Whaley; C. G. Ries

[57] ABSTRACT

A gas trap is disclosed comprising an elongated chamber formed in an integral housing, coolant means formed integrally with two opposite sides of the chamber for trapping the particular gas, such as hydrocarbon, in a filter, as a carbon molecular sieve, and heating means formed integral with the other two opposite sides of the elongated chamber for releasing the particular gas from the sieve for being flushed out to a gas analyzer whereby the integral housing accordingly has a longer life because of the high resistance to cracking due to continuously alternating between thermal expansion and contraction.

4 Claims, 5 Drawing Figures

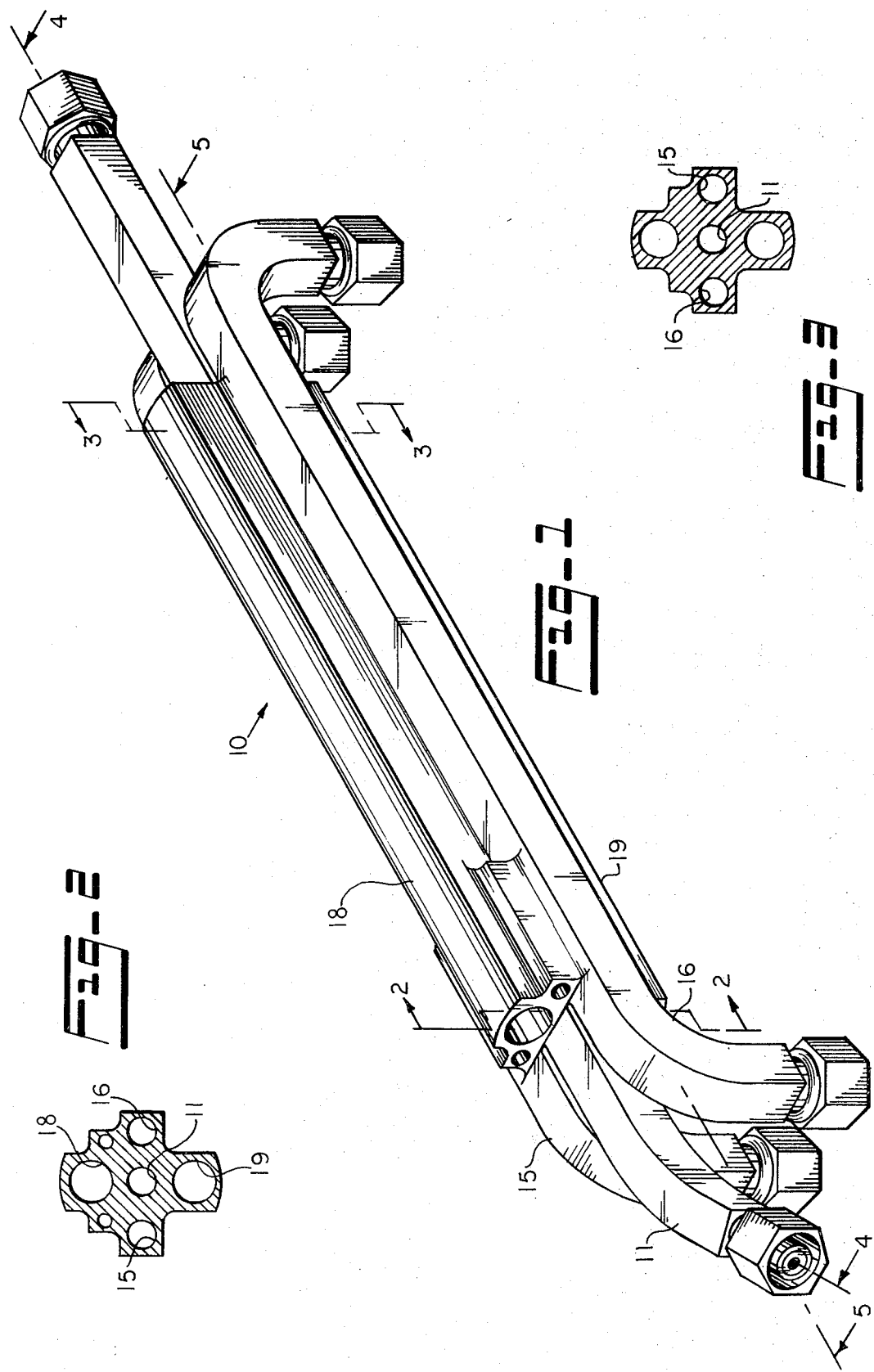

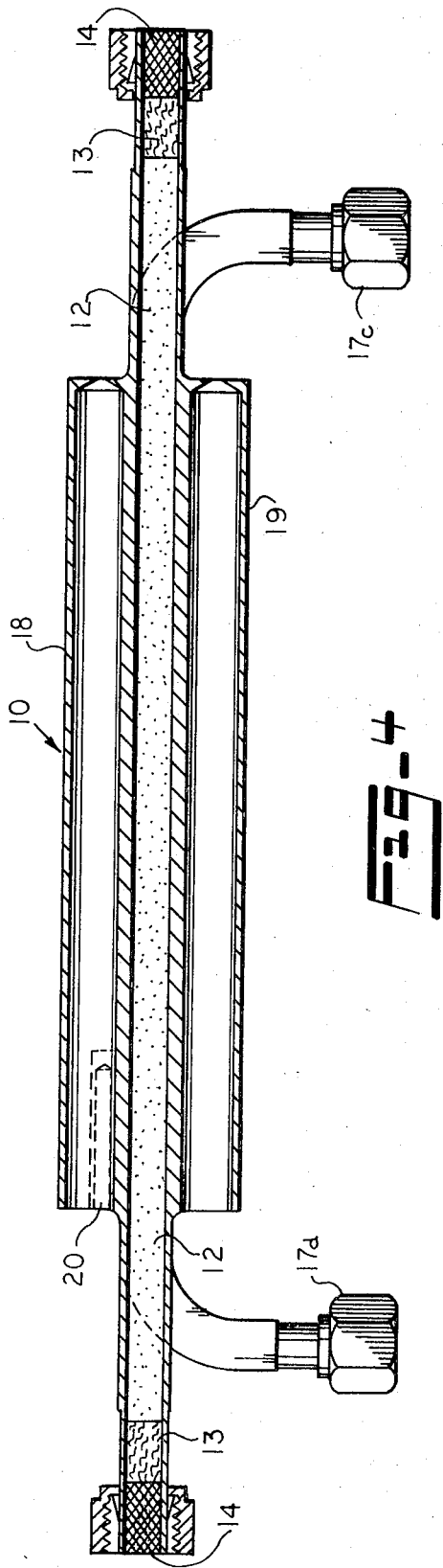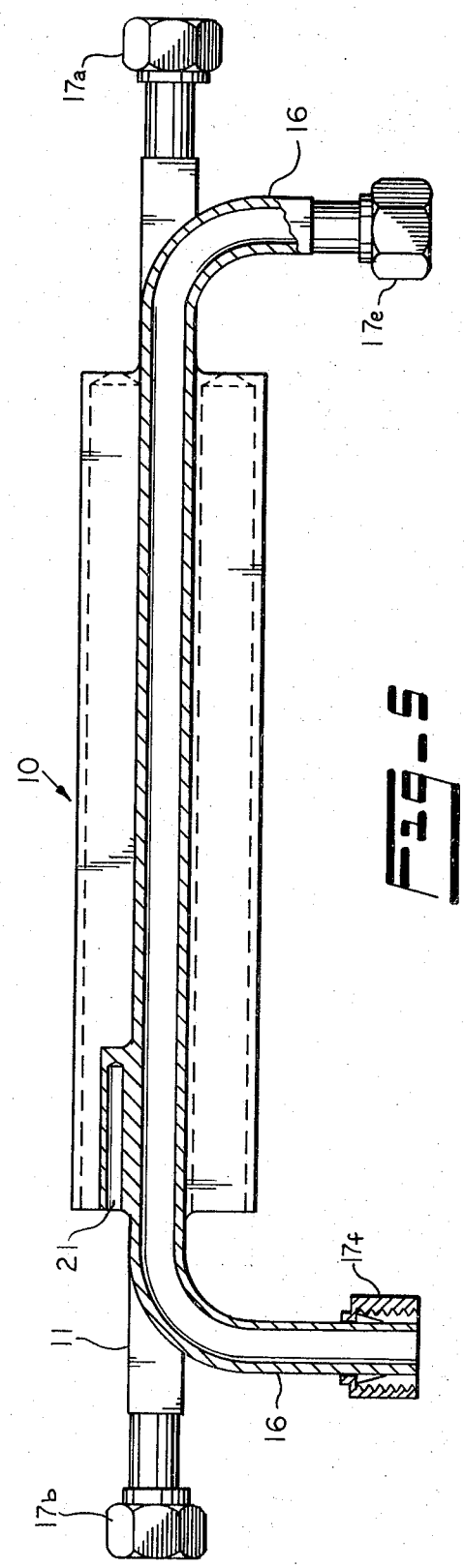

HIGHLY EFFICIENT LONG LIFE GAS TRAP

BACKGROUND OF THE INVENTION

Manufacturing a gas trap that will withstand rapid alternation between very low temperatures and very high temperatures is difficult to accomplish with any degree of economy in materials and labor, and yet maintain a substantial amount of reliability.

One means of analyzing a gas stream, as for hydrocarbon content is to extract the hydrocarbons by using a molecular sieve, an examplar filter material being "Carbosieve," a carbon molecular sieve material. These materials adsorb hydrocarbons at low temperature and release them at elevated temperature. If a continuous gas stream is to be examined for hydrocarbon content, it is necessary to sample the gas for a period of time with the filter material at a low temperature, stop the sample gas flow and extract the collected hydrocarbons by bringing the filter material to an elevated temperature and flushing with a flush gas. It is often desirable to sample and extract at a rapid rate, particularly when hydrocarbon level is changing. This can be conveniently accomplished by means of a device, called a trap, that contains the filter material and suitable means for heating and cooling the filter material. Such a device is difficult to design and build that has high resistance to thermal cracking and accordingly has long life.

OBJECTS OF THE INVENTION

Accordingly, a primary object of this invention is to provide a reliable and long life trap that can be alternately and rapidly heated and cooled as well as contain a filter material.

Another primary object of this invention is to provide a gas trap with a filter material that has a high heat transfer area to the filter material and a low thermal mass.

A further object of this invention is to provide a highly efficient gas trap that will withstand rapid temperature changes and have very little difference in expansion rates of the different parts of the gas trap.

Another object of this invention is to provide a gas trap that will not crack due to differences in thermal coefficients of expansion between the different materials and parts of the gas trap.

Still another object of this invention is to provide a gas trap having a straight tube for containing the filter material for permitting straight forward packing of the trap.

A still further object of this invention is to provide a highly efficient gas trap that will not crack due to rapid variations in thermal expansion and which is easy to operate, is of simple configuration, is economical to build and assemble, and is of greater efficiency while it is alternately and rapidly heated and cooled as well as alternately rapidly heating and cooling the filter material therein.

BRIEF DESCRIPTION OF THE DRAWINGS

The drawings diagrammatically illustrate by way of example, not by way of limitation, one form or mechanism for carrying out the invention wherein like reference numerals have been employed to indicate similar parts in the several views in which:

FIG. 1 is a schematic perspective view of the invention;
FIG. 2 is a section taken at 2—2 on FIG. 1;
FIG. 3 is a section taken at 3—3 on FIG. 1;
FIG. 4 is a section taken at 4—4 on FIG. 1; and
FIG. 5 is a section taken at 5—5 on FIG. 1.

DESCRIPTION OF THE INVENTION

The invention disclosed herein, the scope of which being defined in the appended claims, is not limited in its application to the details of construction and arrangements of parts shown and described, since the invention is capable of other embodiments and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

FIG. 1, a schematic perspective view of the invention, discloses how each part of the new gas trap 10 is formed into one homogeneous integral mechanism.

The new gas trap 10, FIG. 1, comprises the heaters and coolers formed integral with the elongated chamber holding the filter material and through which all of the gas mixture must flow.

A substantially straight elongated chamber 11, FIG. 1, is bored and formed in the center of the gas trap, particularly as illustrated in the sectional views of FIGS. 2 and 3 taken near the respective fore and aft ends of the gas trap.

As illustrated in FIG. 4, a section at 4—4 on FIG. 1, a molecular sieve, as a carbon molecular sieve 12 is substantially centered in the chamber 11 with a packing comprising a glass wool packing 13 at each end held in position by a fine mesh copper screen 14 extending to the ends of the chamber. Carbon molecular sieve 12 is a conventional molecular sieve, such as one using the filter material "Carbonsieve," having regular channels of molecular dimensions throughout which are large enough to admit various small molecules of gas or water but not large enough to admit hydrocarbon molecules. Suitable pipe connections 17a, 17b, FIG. 5, are provided for connecting the elongated chamber 11 to the source of the gas mixture (not shown) for receiving thereof and for connecting to a gas analyzer (not shown) for analyzing the gas separated from the mixture.

Coolers 15 and 16, FIGS. 1–3, are mounted in integral relationship with the two sides of the chamber 11 for maximum area of contact with a full onehalf of the outer surface of the chamber. A refrigerant as an alcohol is circulated through each of the coolers 15 and 16 for cooling of the elongated chamber and particularly for cooling the molecular sieve therein. Suitable and similar pipe connections 17c, 17d, and 17e, 17f are provided on the respective coolers 15 and 16, FIGS. 4 and 5. Preferably, gas trap 10 is machined in one piece and then both tube ends of elements 15 and 16 are bent to the desired shape.

Heaters 18 and 19, FIGS. 1 and 2, are formed likewise in integral relationship with the other two sides, the top and bottom of the elongated chamber 11, as illustrated, for maximum area of contact with the other half of the outer surface of the chamber. An electric heating element (not shown) is positioned in each of the bored cavities in heaters 18 and 19. Thermocouples 20 and 21, FIGS. 4 and 5, respectively, are mounted integrally in heater 19 for monitoring controlling the maximum temperatures of the gas trap.

Briefly, in operation of the disclosed gas trap 10, FIG. 1, for extracting a gas, as hydrocarbons in the preferred instance for further analyzing, a sample of the gas mixture is passed through chamber 11 and through the carbon molecular sieve therein for a predetermined period of time. During this period, the filter material 12, FIG. 4, therein chamber 11 is maintained cooled at a predetermined low temperature by the coolers integral with both sides of the chamber. At the end of this time period, the gas flow is stopped and the collected hydrocarbons are extracted by rapidly bringing the filter material 12, FIG. 4, to the predetermined elevated temperature and flushing the chamber 11 with a flush gas, as helium. For a continuous gas stream, this operation is repeated continuously. Likewise, it is often desirable to sample and extract gas at a rapid rate, particularly when the hydrocarbon level is changing. This rapid sampling with the attendant and rapid cooling and heating of the whole gas sampler is easily, conveniently, and reliably accomplished with the disclosed gas trap, the disclosed gas trap having a long life compared to prior gas samplers due to its ability to accept high thermal stresses due to the rapid changes in temperature.

Thus accordingly, it will be seen that the present highly efficient, long life gas trap operates in a manner which meets each of the objects set forth hereinbefore.

While only one embodiment of the invention has been disclosed, it will be evident that various modifications are possible in the arrangement and construction of the disclosed long life gas trap without departing from the scope of the invention, and it is accordingly desired to comprehend within the purview of this invention such modifications as may be considered to fall within the scope of the amended claims.

I claim:

1. A hydrocarbon long life gas trap for gas analysis comprising,
   a. an elongated one piece housing,
   b. an elongated chamber in said one piece housing having a molecular sieve therein for trapping and releasing a particular gas in a gas mixture, as inlet and an outlet for the passage of the gas mixture therethrough, and four sides around the elongated chamber but within said one piece housing,
   c. coolant means formed integrally with two opposite sides of said elongated chamber for trapping the particular gas in said molecular sieve,
   d. heating means formed integrally with the other two opposite sides of said elongated chamber for releasing the particular gas from the trap for being flushed out for gas analysis, whereby said one piece housing accordingly resists cracking due to continuously alternating between thermal expansion and contraction for long life, and
   e. said molecular sieve is a carbon molecular sieve for trapping hydrocarbon gases in the gas mixture.

2. A long life hydrocarbon trap for gas analysis comprising,
   a. an elongated one piece housing,
   b. an elongated chamber in said one piece housing having a carbon molecular sieve therein and an inlet and an outlet for the passage of gas therethrough,
   c. coolant means formed integrally with said one piece housing and contiguous with said elongated chamber for cooling said gas for trapping any hydrocarbon gas in said carbon molecular sieve, and
   d. heating means formed integrally with said one piece housing and contiguous with said elongated chamber for heating said carbon molecular sieve for releasing the hydrocarbon gas from the trap for being flushed out for gas analysis, whereby the hydrocarbon trap is crack resistant and accordingly has a long life.

3. A hydrocarbon trap as recited in claim 6 wherein,
   a. said carbon molecular sieve is secured in said elongated chamber with a glass wool packing at each end of the carbon molecular sieve, and
   b. a fine mesh copper screen in each of said elongated chamber ends adjacent said glass wool packings.

4. A hydrocarbon trap as recited in claim 6 wherein,
   a. said coolant means comprises,
      1. two elongated passages, each passage being bored in said housing contiguous with an opposite side of said elongated chamber, and
      2. a refrigerant circulating through said two elongated passages on opposite sides of said elongated chamber for highly efficient chilling of said molecular sieve, and
   b. said heating means comprises,
      1. two elongated passages, each passage being bored in said housing contiguous with an opposite side of said elongated chamber, and
      2. an elongated electrical heating element positioned in each of said two elongated passages for highly efficient heating of said molecular sieve.

* * * * *